United States Patent
Huang

(10) Patent No.: US 8,654,207 B2
(45) Date of Patent: Feb. 18, 2014

(54) IMAGING PICKUP APPARATUS, IMAGE PICKUP METHOD, IMAGE PROCESSING APPARATUS, IMAGE PROCESSING METHOD, AND IMAGE PROCESSING PROGRAM

(75) Inventor: Huakun Huang, Tokyo (JP)

(73) Assignee: Sony Corporation, Tokyo (JP)

( * ) Notice: Subject to any disclaimer, the term of this patent is extended or adjusted under 35 U.S.C. 154(b) by 1202 days.

(21) Appl. No.: 11/907,324

(22) Filed: Oct. 11, 2007

(65) Prior Publication Data

US 2008/0094485 A1  Apr. 24, 2008

(30) Foreign Application Priority Data

Oct. 20, 2006  (JP) .................. 2006-286017

(51) Int. Cl.
*H04N 9/73* (2006.01)
(52) U.S. Cl.
USPC .................... 348/223.1; 348/225.1
(58) Field of Classification Search
USPC ............... 348/223.1, 225.1, 655, E13.069, 348/E9.051, FOR. 2
See application file for complete search history.

(56) References Cited

U.S. PATENT DOCUMENTS

| | | | |
|---|---|---|---|
| 7,542,077 B2 * | 6/2009 | Miki ......................... | 348/223.1 |
| 7,573,505 B2 * | 8/2009 | Kawaguchi et al. ....... | 348/222.1 |
| 2005/0219587 A1 | 10/2005 | Hayaishi | |
| 2007/0122034 A1 * | 5/2007 | Maor .......................... | 382/181 |

FOREIGN PATENT DOCUMENTS

| | | |
|---|---|---|
| JP | 2003-189325 | 7/2003 |
| JP | 2004-282133 | 10/2004 |
| JP | 2005-136497 | 5/2005 |
| JP | 2005-197996 | 7/2005 |
| JP | 2005-318523 | 11/2005 |
| JP | 2006-042152 | 2/2006 |
| JP | 2006-148326 | 6/2006 |

OTHER PUBLICATIONS

Japanese Office Action issued Sep. 30, 2008 for corresponding Japanese Application No. 2006-286017.
Chinese Office Action issued Sep. 4, 2009 for corresponding Japanese Application No. 200710162889.3.

* cited by examiner

*Primary Examiner* — Roberto Velez
*Assistant Examiner* — Yih-Sien Kao
(74) *Attorney, Agent, or Firm* — Rader, Fishman & Grauer PLLC

(57) ABSTRACT

An image pickup apparatus includes a color component acquiring unit that acquires picked-up-image color-component signals representing color components of a picked-up image, a face detecting unit that detects a face, a skin-color-region color-component acquiring unit that, when the picked-up image includes a face, acquires skin-color-region color-component signals based on a face detection result, a skin-color-eliminated-component-signal-information creating unit that creates skin-color-eliminated component-signal information obtained by eliminating the skin-color-region color-component signals, obtained by the skin-color-region color-component acquiring unit, from the picked-up-image color-component signals obtained by the color component acquiring unit, a white-balance-gain setting unit that sets a white balance gain by using the skin-color-eliminated component-signal information, and a white balance control unit that performs white balance adjustment of the color components of the picked-up image by using the white balance gain.

14 Claims, 9 Drawing Sheets

IMAGING PICKUP APPARATUS, IMAGE PICKUP METHOD, IMAGE PROCESSING APPARATUS, IMAGE PROCESSING METHOD, AND IMAGE PROCESSING PROGRAM

CROSS REFERENCES TO RELATED APPLICATIONS

The present invention contains subject matter related to Japanese Patent Application JP 2006-286017 filed in the Japanese Patent Office on Oct. 20, 2006, the entire contents of which are incorporated herein by reference.

BACKGROUND OF THE INVENTION

1. Field of the Invention

The present invention relates to image pickup apparatuses, image pickup methods, image processing apparatuses, image processing methods, and image processing programs. In particular, the present invention relates to an image pickup apparatus, an image pickup method, an image processing apparatus, an image processing method, and an image processing program that have white balance functions.

2. Description of the Related Art

In recent years, digital image pickup apparatuses, such as digital still cameras and digital video cameras, have become increasingly used, and these products have become increasingly sophisticated. Accordingly, manufacturers of image pickup apparatuses want to increase the commercial values of their products by providing them with more advanced functions.

An auto white balance function is one of such image pickup apparatus functions. In the auto white balance function, an original color of white can be reproduced as white by setting the proportions of RGB (red, green, blue) uniformly in order to automatically adapt to a change in tint of a light source for a subject.

In general, an image pickup apparatus having an auto white balance function performs color control in which an achromatic color portion on a subject is extracted and set to be achromatic. In this control, since the color of the subject changes depending on light, a range of colors in the achromatic color portion under natural light is treated as an achromatic color detection range.

However, this control may mistakenly determine that a skin color is achromatic because a face's skin color is very close to the tint of the achromatic color portion under a low-color-temperature light source. In particular, this tendency is high when an image has a large skin color area. This results in a shift in white-balance-gain, thus causing the image to be blue.

Accordingly, a white-balance-gain setting method is known (see, for example, Japanese Unexamined Patent Application Publication No. 2003-189325). In this method, when a face is detected by detecting a face included in a picked-up image, by moving, a white-balance-evaluation-value acquisition area for setting a white-balance-gain to an area other than that of the face, a calculation of face portion white balance is prevented from being performed.

SUMMARY OF THE INVENTION

In the white-balance-gain setting method, because the white-balance-evaluation-value acquisition area is moved from the face portion before being set and the white balance evaluation value is acquired, when the picked-up image includes a plurality of faces, areas excluding the faces are irregular, thus making it difficult to acquire a white balance evaluation value.

In addition, in a case in which the picked-up image includes a plurality of faces, when an undetected face exists due to false detection, there is a problem in that auto white balance processing is affected by the skin color of the undetected face.

The present invention has been made in view of the above-described circumstances. It is desirable to provide an image pickup apparatus, image pickup method, image processing apparatus, image processing method, and image processing program for facilitating white balance control.

According to an embodiment of the present invention, an image pickup apparatus for picking up an image by using a solid-state image sensing device is provided. The image pickup apparatus includes a color-component acquiring unit that acquires picked-up-image color-component signals representing color-components of the picked-up image, a face detecting unit that detects a face from the picked-up image, a skin-color-region color-component acquiring unit that, when the picked-up image includes a face, acquires skin-color-region color-component signals based on a face detection result, a skin-color-eliminated-component-signal-information creating unit that creates skin-color-eliminated component-signal information obtained by eliminating the skin-color-region color-component signals obtained by the skin-color-region color-component acquiring unit from the picked-up-image color-component signals obtained by the color-component acquiring unit, a white-balance-gain setting unit that sets a white-balance-gain by using the skin-color-eliminated component-signal information, and a white balance control unit that performs white balance adjustment of the color-components of the picked-up image by using the white-balance-gain.

According to the image pickup apparatus, the color-component acquiring unit acquires picked-up-image color-component signals representing color-components of a picked-up image. The face detecting unit detects a face from the picked-up image. When the picked-up image includes a face, the skin-color-region color-component acquiring unit acquires skin-color-region color-component signals based on a face detection result. After that, the skin-color-eliminated-component-signal-information creating unit creates skin-color-eliminated component-signal information obtained by eliminating the skin-color-region color-component signals obtained by the skin-color-region color-component acquiring unit from the picked-up-image color-component signals obtained by the color-component acquiring unit. The white-balance-gain setting unit sets a white-balance-gain by using the skin-color-eliminated component-signal information. The white balance control unit performs white balance adjustment of the color-components of the picked-up image by using the white-balance-gain.

According to an embodiment of the present invention, when a picked-up image includes a face, skin-color-region color-component signals based on a face detection result are required, and skin-color-eliminated component-signal information obtained by eliminating skin-color-region color-component signals from picked-up-image color-component signals is created. The skin-color-eliminated component-signal information is used to set a white-balance-gain. Thus, even if the picked-up image includes a plurality of faces, from the face detection result, an area to be subject to detection can be designated. Therefore, white balance control is facilitated.

In particular, in the case of generating color-component integration values by respectively integrating the picked-upimage color-component signals, generating skin-color-region-color-component integration values by respectively integrating color-component signals of a detected face, calculating threshold values by using the skin-color-region-color-component integration values and acquiring color-component integration values of the picked-up image that satisfy the threshold values, and creates the skin-color-eliminated component-signal information by calculating differences between the color-component integration values and the color-component integration values that satisfy the threshold values, highly accurate white balance control is possible.

DESCRIPTION OF THE PREFERRED EMBODIMENTS

Embodiments of the present invention are described below with reference to the accompanying drawings.

Figure 1:
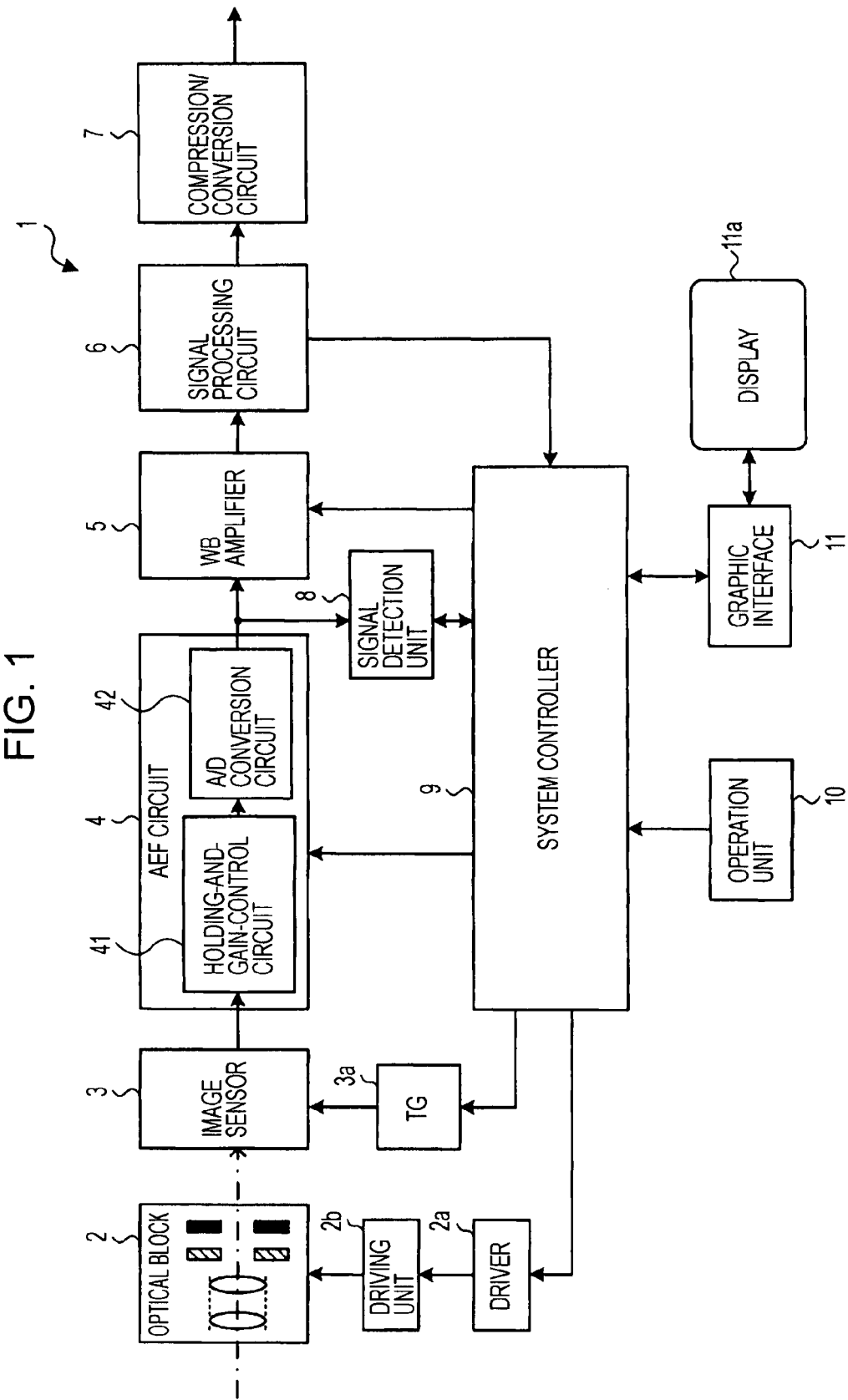
FIG. 1 is a block diagram showing the configuration of an image pickup apparatus according to a first embodiment of the present invention.

FIG. 1 is a block diagram showing the configuration of an image pickup apparatus 1 according to a first embodiment of the present invention.

The image pickup apparatus 1 includes an optical block 2, a driver 2a, a driving unit 2b, an image sensor 3, a timing generating circuit (TG) 3a, an AFE (analog front end) circuit 4, a WB (white balance) amplifier 5, a signal processing circuit 6, a compression/conversion circuit 7, a signal detection unit 8, a system controller 9, an operation unit 10, a graphic interface 11, and a display (image monitor) 11a.

The optical block 2 includes a lens unit for condensing incident light from a light source and light (reflected light) from a subject to the image sensor 3, a driving mechanism for performing focusing and zooming by moving the lens unit, a shutter mechanism, and an iris mechanism for determining the amount of light passing through the lens unit, that is, an exposure, by adjusting a lens stop depending on a subject's illuminance.

On the basis of a control signal from the system controller 9, the driver 2a outputs a driving signal for controlling the driving (such as diaphragm driving) of the mechanisms in the optical block 2.

The driving unit 2b drives the driving mechanisms of the optical block 2 in response to the driving signal from the driver 2a.

The image sensor 3 is, for example, a solid-state image sensing device of a type such as a CCD (charge coupled device) type or a CMOS (complementary metal oxide semiconductor) type. The image sensor 3 photoelectrically converts an optical image passing through the optical block 2, and sends the converted signal to the AFE circuit 4.

Under the control of the system controller 9, the TG 3a outputs a timing signal for controlling the driving of the image sensor 3.

The AFE circuit 4 includes a holding-and-gain-control circuit 41 and an A/D (analog-to-digital) conversion circuit 42. The AFE circuit 4 is formed as, for example, a single IC (integrated circuit). The holding-and-gain-control circuit 41 performs sampling and holding on the image signal output from the image sensor 3 by performing CDS (correlated double sampling) so that a good S/N (signal/noise) ratio can be maintained, and also performs AGC (auto gain control) processing to control a gain. The A/D conversion circuit 42 outputs a digital image signal by performing A/D conversion. A circuit for performing the CDS processing may be formed on the same substrate as the image sensor 3.

On the basis of an input auto white-balance-gain (white balance control signal), the WB amplifier 5 generates an image signal having an adjusted white balance. Specifically, in white balance adjustment, each of RGB gains is adjusted depending on the white balance control signal, and each of RGB amplitudes of the image signal output from the A/D conversion circuit 42 is amplified. The control by the WB amplifier 5 is hereinafter referred to as "auto white balance control".

The signal processing circuit 6 performs digital signal processing, such as linear matrix processing, gamma processing, and color-difference matrix processing, on an input image signal.

The signal processing circuit 6 generates video signals (luminance and color-difference signals) of the subject by performing various types of image quality correction on the image signal from the WB amplifier 5 in accordance with the control signal from the system controller 9.

The signal processing circuit 6 also has a function of detecting a person's face from an input image. The signal processing circuit 6 detects a region including a person's face from the image signal from the WB amplifier 5, and supplies the result of detection to the system controller 9.

The compression/conversion circuit 7 performs compression encoding based on the luminance and color-difference signals. A signal compressed by the compression/conversion circuit 7 is recorded as an image file on a recording medium (not shown).

The signal detection unit 8 detects RGB components for white balance control from the signal. The signal detection unit 8 forms each main portion of a color-component acquiring unit and skin-color-region color-component acquiring unit in an image pickup apparatus according to an embodiment of the present invention. Details of the signal detection unit 8 are described later.

The system controller 9 is a microcontroller including, for example, a CPU (central processing unit), a ROM (read-only memory), and a RAM (random access memory). By executing a program stored in the ROM or the like, the system controller 9 overall controls portions of the image pickup apparatus 1, such as the optical block 2, the image sensor 3, the AFE circuit 4, the WB amplifier 5, and the signal processing circuit 6, whereby auto focusing, auto exposure, and white balance are automatically controlled to generate preferable video signals of the subject whose image is picked up. The system controller 9 forms a main portion of each of a skin-color-eliminated-component-signal-information creating unit and white-balance-gain setting unit in an image pickup apparatus according to an embodiment of the present invention.

The operation unit 10 includes, for example, various operation keys, such as a shutter release button, levers, and a dial, and outputs a control signal based on an user's input operation to the system controller 9.

The graphic interface 11 generates an image signal for displaying an image on the display 11a from the image signal supplied from the signal processing circuit 6 via the system controller 9. By supplying the generated image signal, the graphic interface 11 displays the image on the display 11a. The display 11a is formed by, for example, a LCD (liquid crystal display), and displays images, such as camera-through images being picked up and playback images, based on data recorded on the recording medium (not shown).

In the image pickup apparatus 1, image light (reflected light) from the subject converges in the optical block 2 and is incident on the image sensor 3. The image light incident on the image sensor 3 is photoelectrically converted into an electric signal. The obtained electric signal is input to the holding-and-gain-control circuit 41, and a signal obtained by sampling and gain control in the holding-and-gain-control circuit 41 is input to the A/D conversion circuit 42. The signal input to the A/D conversion circuit 42 is converted into a digital signal, and the digital signal is input to the WB amplifier 5 and the signal detection unit 8.

After RGB components for white balance control are detected from the digital signal, the result of detection is sent to the system controller 9 by the signal detection unit 8.

At this time, the signal processing circuit 6 detects a region including a person's face for the input digital signal input to the system controller 9. When the face is included, the system controller 9 sets an auto white-balance-gain value so that an original color of white is represented by white.

The WB amplifier 5 generates an image signal having a white balance adjusted on the basis of the set auto white-balance-gain value, and inputs the generated image signal to the signal processing circuit 6. The signal processing circuit 6 performs digital signal processing, such as linear matrix processing, on the input image signal. The processed signal is compressed and converted by the compression/conversion circuit 7, and the obtained signal is recorded as an image file on the recording medium (not shown).

Next, the operation of the image pickup apparatus 1 according to the first embodiment is described below.

Figure 2:
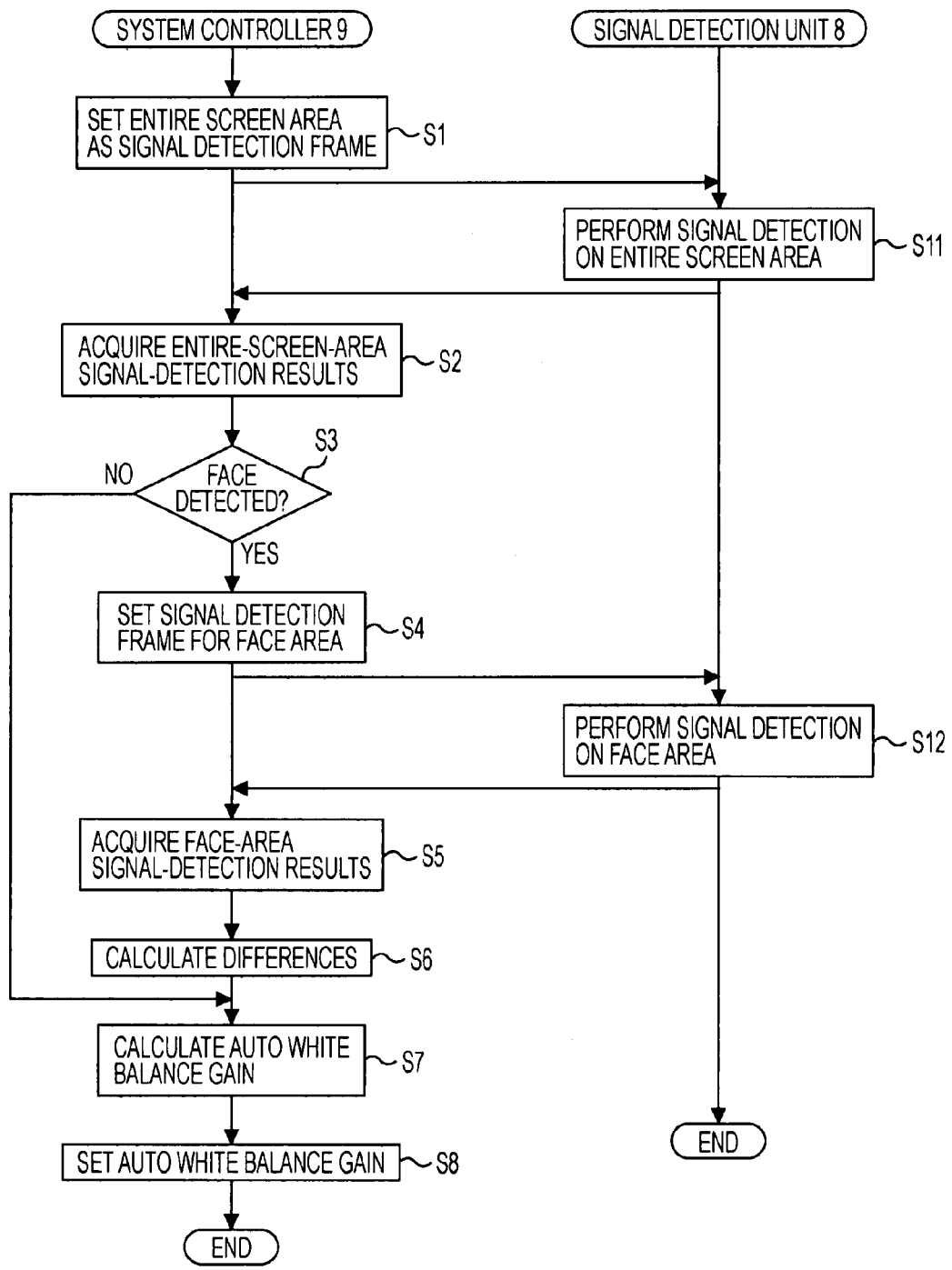
FIG. 2 is a flowchart showing the operation of the image pickup apparatus according to the first embodiment.
Figure 3:
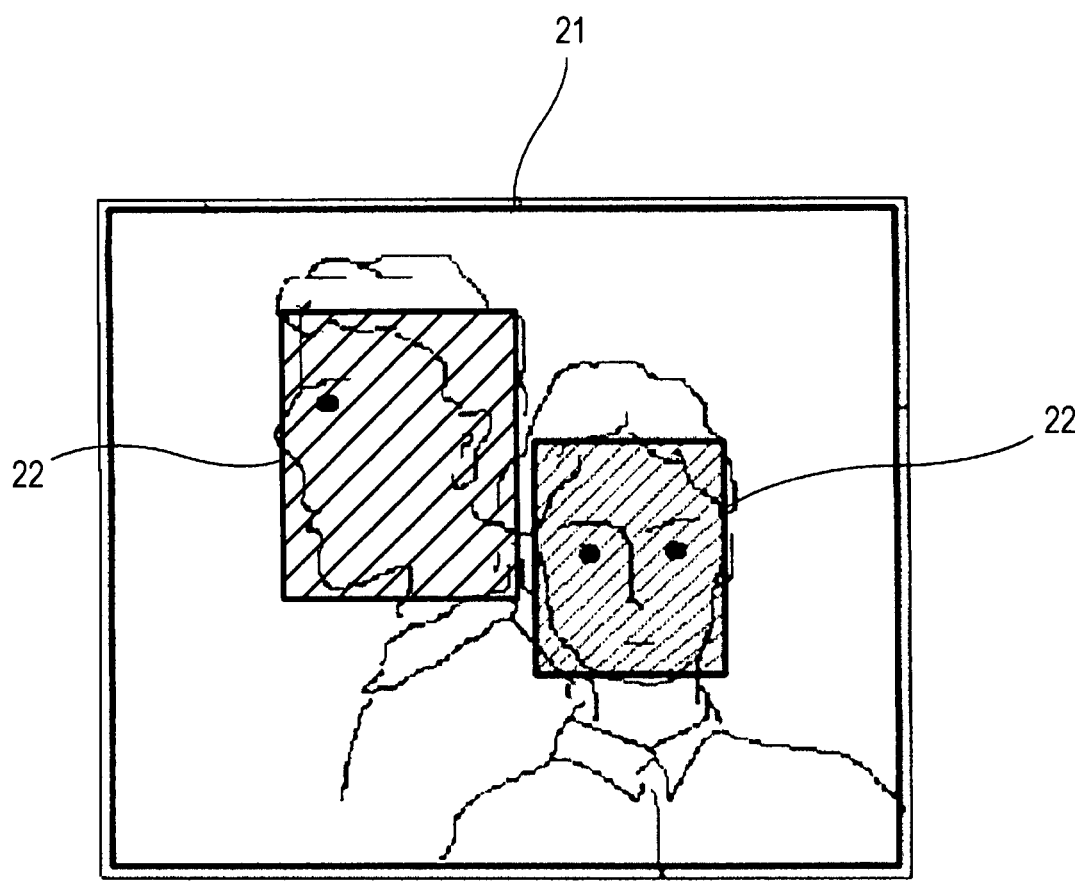
FIG. 3 is an illustration of a picked-up image.

FIG. 2 is a flowchart showing the operation of the image pickup apparatus 1 according to the first embodiment. FIG. 3 is an illustration of a picked-up image.

In step S1, the system controller 9 sets an entire screen area 21 (see FIG. 3) in a picked-up image as a signal detection frame, and sends a signal detection request to the signal detection unit 8.

In step S11, by performing signal detection on the entire screen area 21 by using a preset parameter for achromatic color extraction, the signal detection unit 8 calculates and sends integration values (represented by $\Sigma R$, $\Sigma G$, and $\Sigma B$) of color-component signals and an integration area (represented by A) in the entire screen area 21, as entire-screen-area signal-detection results, to the system controller 9.

In step S2, the system controller 9 acquires and stores the entire-screen-area signal-detection results in the RAM. The integration area (A) represents the area (i.e., the number of pixels) of a region that is actually subject to integration in the picked-up image.

In step S3, on the basis of a detection signal from the signal processing circuit 6, the system controller 9 determines whether a face has been detected in the entire screen area 21.

If a face has not been detected in the entire screen area 21 (No in step S3), the system controller 9 proceeds to step S7.

Alternatively, if a face has been detected in the entire screen area 21 (Yes in step S3), the system controller 9 creates information for eliminating the face's skin color. Specifically, in step S4, a signal detection frame for auto white balance control is set in each detected face area 22 (see FIG. 3), and a signal detection request for the face area 22 is sent to the signal detection unit 8.

In step S12, the signal detection unit 8 performs signal detection on the face area 22 by using the same parameter used in step S11, and calculates and sends color-component integration values (represented by $\Sigma R_F$, $\Sigma G_F$, and $\Sigma B_F$) and a skin color integration area (represented by $A_F$) in the face's skin color region, as face-area signal-detection results, to the system controller 9.

In step S5, the system controller 9 acquires the face-area signal-detection results. In step S6, by calculating differences of the color-component integration values ($\Sigma R_F$, $\Sigma G_F$, $\Sigma B_F$) and skin color integration area ($A_F$) in the face areas 22 from the color-component integration values ($\Sigma R$, $\Sigma G$, $\Sigma B$) and integration area (A) (obtained in step S2) in the entire screen area 21, the system controller 9 calculates an integration value (skin-color-eliminated component-signal information) and an integration area (skin-color-eliminated component-signal information) for auto white balance control. The skin color integration area ($A_F$) represents the area (the number of pixels) of each region that is actually subject to integration in the face area 22.

The obtained integration values ($\Sigma R_W$, $\Sigma G_W$, $\Sigma B_W$) and integration area ($A_W$) are represented by $$\Sigma R_W = \Sigma R - \Sigma R_F$$

$$\Sigma G_W = \Sigma G - \Sigma G_F$$

$$\Sigma B_W = \Sigma B - \Sigma B_F$$

$$A_W = A - A_F$$

In step S7, the system controller 9 calculates a final auto white-balance-gain for auto white balance control by using the obtained integration values. Specifically, when the face has not been detected in the entire screen area 21, the auto white-balance-gain is calculated by using the integration values ($\Sigma R$, $\Sigma G$, $\Sigma B$) and the integration area (A). If the face has been detected in the entire screen area 21, such an auto white-balance-gain, as the RGB components are equal, is calculated by using the integration values ($\Sigma R_W$, $\Sigma G_W$, $\Sigma B_W$) and the integration area ($A_W$).

Although, in the detection in step S11, an entire image is basically set as the signal detection frame, actually, all pixel signals of the image may not be detected. For example, only pixels having luminance values equal to or greater than a predetermined luminance threshold value may be detected. Alternatively, detection regions may be set at some intervals. Similarly, in the detection in step S12, all the pixel signals in the face area 22 may not be detected. In step S12, for example, a luminance threshold value different from that in step S11 may be set as a detection parameter specific to face detection, and only pixels having luminance values equal to or greater than the set luminance threshold value may be detected. As described above, when different detection parameters are set in steps S11 and S12, in step S7, by calculating the auto white-balance-gain by using an average value obtained by dividing the integration values ($\Sigma R_W$, $\Sigma G_W$, $\Sigma B_W$) by the integration area ($A_W$), the calculation accuracy can be enhanced.

In step S8, the system controller 9 outputs the calculated auto white-balance-gain to the WB amplifier 5. The WB amplifier 5 applies the auto white-balance-gain to the input image signal, whereby the white balance is adjusted.

As described above, in the image pickup apparatus 1 according to the first embodiment, when a face is detected by the signal processing circuit 6, signal detection on the skin color of the face area 22 is performed, and, by calculating differences of the color-component integration values ($\Sigma R_F$, $\Sigma G_F$, $\Sigma B_F$) and skin-color integration area ($A_F$) in the face area 22 from the color-component integration values ($\Sigma R$, $\Sigma G$, $\Sigma B$) and integration area (A) in the entire screen area 21, an integration value and integration area for auto white balance control can be calculated. This excludes an effect of the face's skin color from calculation of the auto white-balance-gain. Thus, highly accurate auto white balance control is possible.

In addition, even if a picked-up image includes a plurality of faces, the image pickup apparatus 1 responds to detection regions for the faces, in other words, the image pickup apparatus 1 simply performs detection with a rectangular signal detection frame. Accordingly, regardless of the number of faces, by designating the face area 22, false control (setting) of the auto white-balance-gain due to a skin color effect can be prevented.

Although, in the first embodiment, face detection is performed by the signal processing circuit 6, it is not limited thereto, and, by providing a dedicated separate face detection circuit, faces in the entire screen area 21 can be detected.

As described above, when the picked-up image includes a plurality of faces, if an undetected face exists due to false detection, there is a problem in that the auto white balance processing is affected by the skin color of the undetected face.

Figure 4:
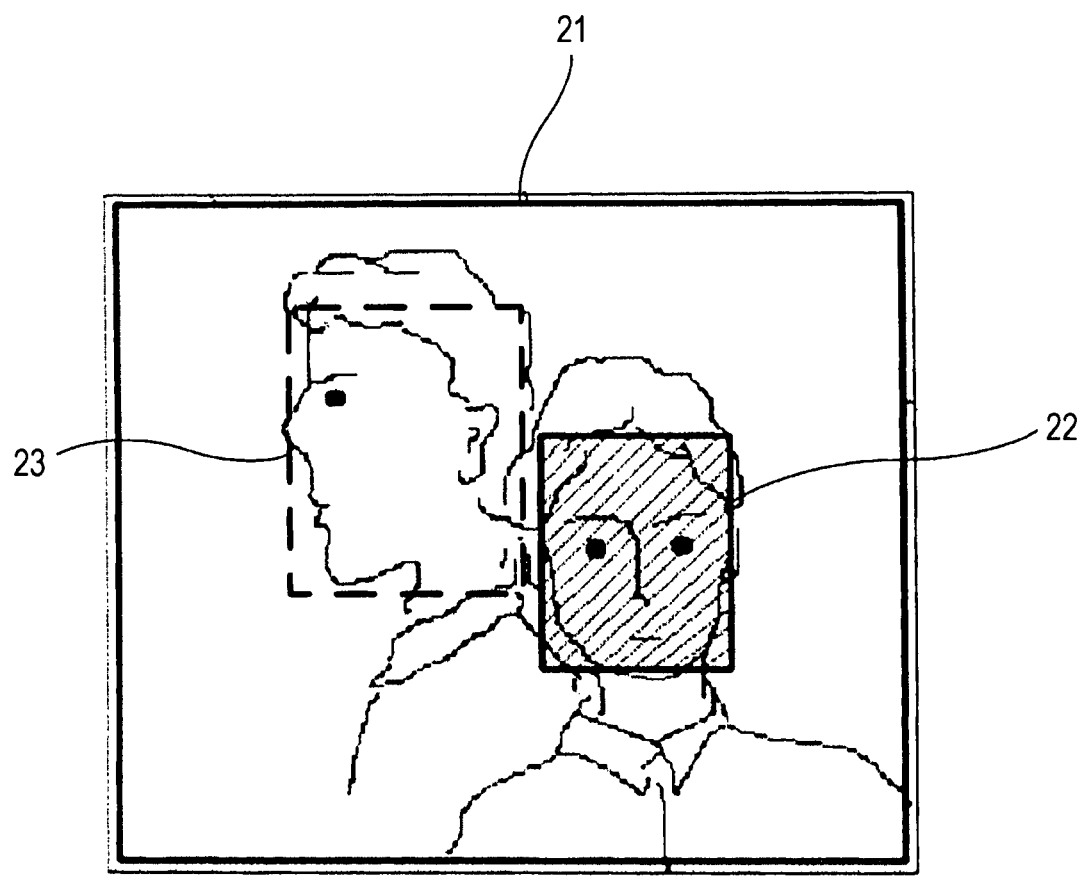
FIG. 4 is an illustration of the result of face detection on the picked-up image.

FIG. 4 is an illustration of the result of face detection in a picked-up image.

As shown in FIG. 4, due to false detection, only a right face in the entire screen area 21 is detected and is set as a face area 22. In this case, an undetected left face area 23 is out of the range for signal detection for calculating color-component integration values ($\Sigma R_F$, $\Sigma G_F$, $\Sigma B_F$). Thus, an error occurs in the auto white-balance-gain. An image pickup apparatus for solving this problem, according to a second embodiment of the present invention, is described below.

Regarding the image pickup apparatus according to the second embodiment, differences from the first embodiment are described mainly, and similar descriptions are omitted.

The operation of the image pickup apparatus according to the second embodiment is described below.

Figure 5:
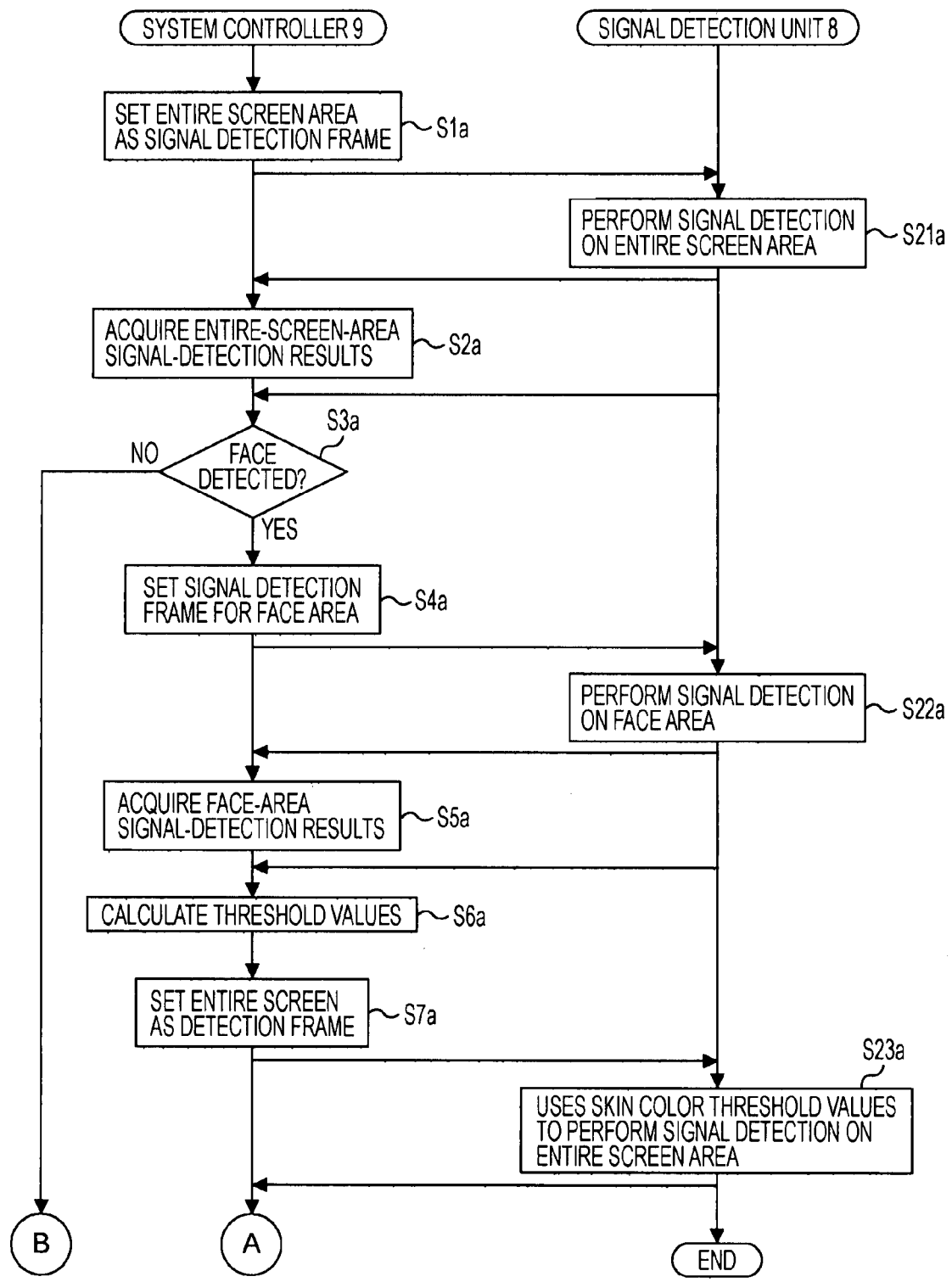
FIG. 5 is a flowchart showing the operation of an image pickup apparatus according to a second embodiment of the present invention.
Figure 6:
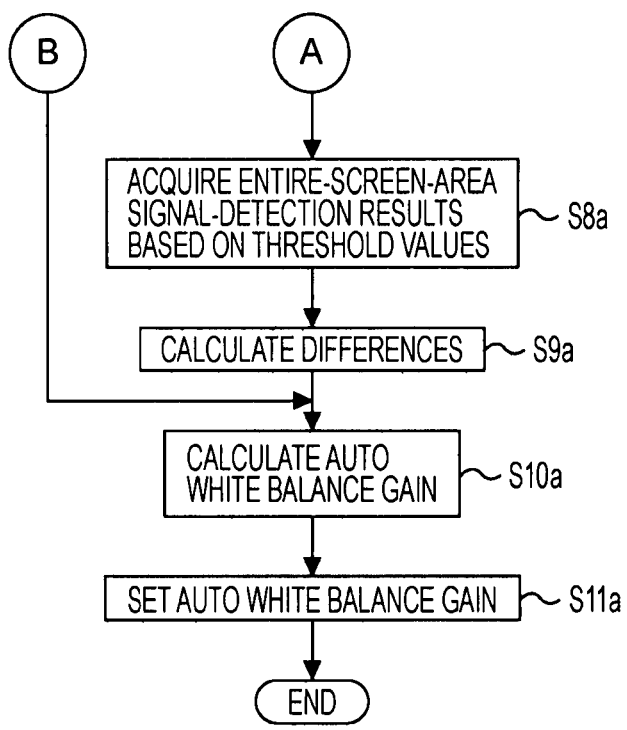
FIG. 6 is a flowchart showing the operation of the image pickup apparatus according to the second embodiment.

FIGS. 5 and 6 are flowcharts showing the operation of the image pickup apparatus according to the second embodiment.

Steps S1a to S4a of the system controller 9 and steps S21a and S22a of the signal detection unit 8 in FIG. 5 are respectively similar to steps S1 to S4 of the system controller 9 and steps S11 and S12 of the signal detection unit 8 in FIG. 2. Accordingly, their descriptions are omitted below.

After executing step S4a, in step S5a, the system controller 9 acquires the face-area signal-detection results. In step S6a, the system controller 9 calculates skin color threshold values obtained when calculated integration values of the face area 22 are plotted on a color-difference graph. This processing is described by using a (B–Y, R–Y) plane as an example.

Figure 7:
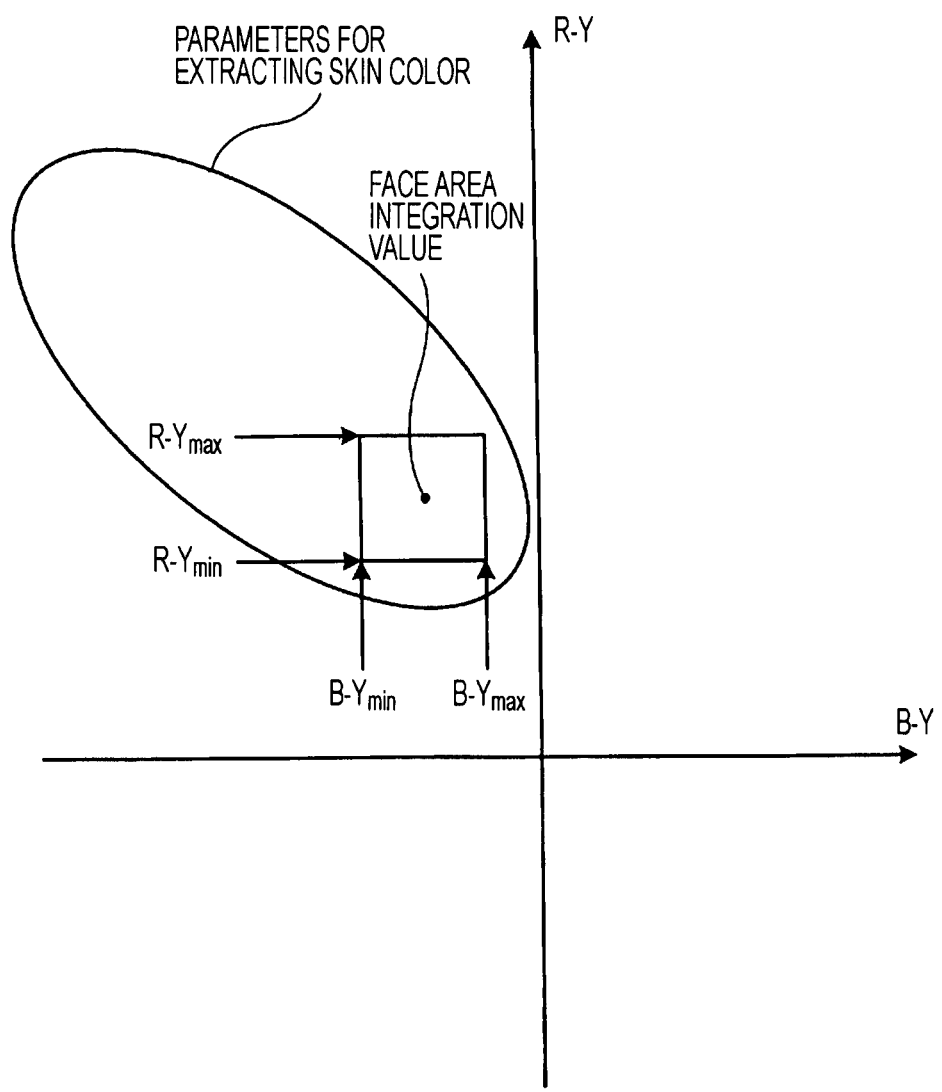
FIG. 7 is a graph illustrating a method for calculating skin color threshold values.

FIG. 7 is a graph illustrating a method for calculating skin color threshold values.

As shown in FIG. 7, color-component integration values, obtained in step S5a, in the face detection region, are plotted in a region on the color-difference plane, which generally represents a skin color. In this case, a Y-axial maximum value (R–$Y_{max}$) and minimum value (R–$Y_{min}$), and a X-axial maximum value (B–$Y_{max}$) and minimum value (B–$Y_{min}$), placed at a predetermined distance from the plotted coordinates so as to surround the coordinates, are set as skin color threshold values.

By storing beforehand a plurality of combinations of $Y_{max}$ and $Y_{min}$ in the ROM or the like, and, correspondingly to the plotted coordinates, reading one combination of $Y_{max}$ and $Y_{min}$ (i.e., values whose coordinates exist in a region defined by the threshold values), the skin color threshold values can be determined. In addition, the stored combinations of $Y_{max}$ and $Y_{min}$ may correspond to types of light sources (e.g., sunlight, an electric bulb, a fluorescent light, etc.) determined beforehand for auto white balance control.

In step S7a, the system controller 9 sets the entire screen area 21 as a signal detection frame, and sends a signal detection request for the entire screen area 21 for detection using the skin color threshold values to the signal detection unit 8.

In step S23a, the signal detection unit 8 uses the skin color threshold values to perform signal detection on the entire screen area 21. The signal detection unit 8 calculates and sends as entire-screen-area signal-detection results based on the threshold values, color-component integration values (represented by $\Sigma R'$, $\Sigma G'$, and $\Sigma B'$) and an integration area (represented by A') that satisfy (in other words, correspond to values in the region surrounded by the threshold values) threshold values in the entire screen area 21 to the system controller 9.

Figure 8:
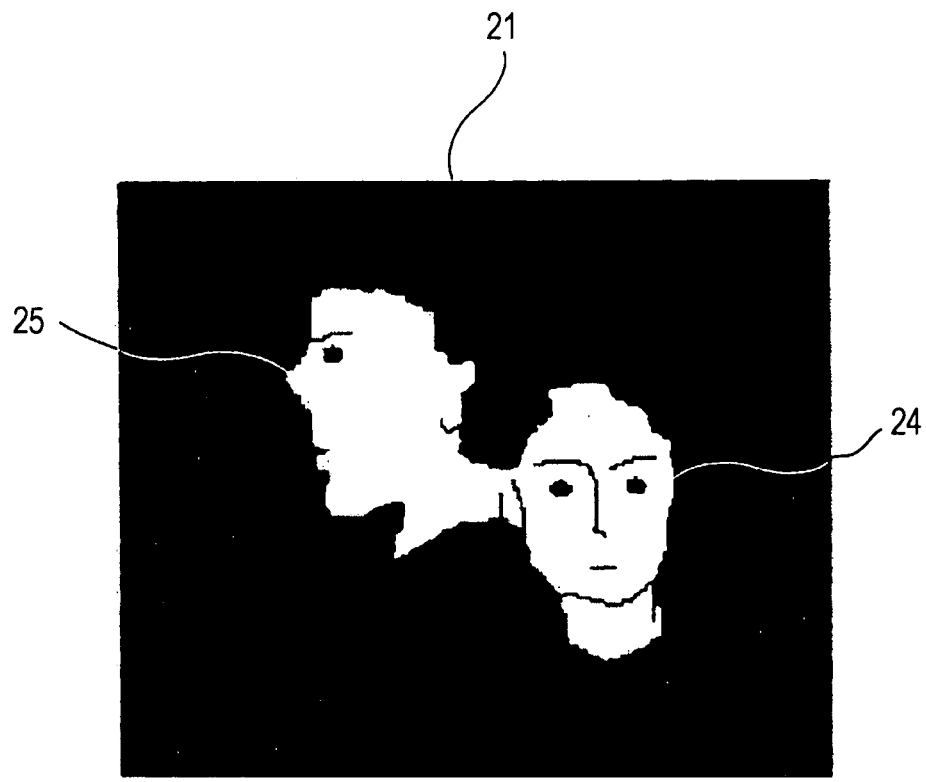
FIG. 8 is an illustration of the result of detection using threshold values.

FIG. 8 is an illustration of the result of detection using the threshold values.

In the processing in step S22a, in addition to color-component integration values of a right face 24, color-component integration values of a left face 25 undetected from a face detection signal in step S3a are included in the entire-screen-area signal-detection results based on the threshold values.

In step S8a, the system controller 9 acquires the entire-screen-area signal-detection results based on the threshold values. In step S9a, from the color-component integration values ($\Sigma R$, $\Sigma G$, $\Sigma B$) and integration area (A) (obtained in step S2a) in the entire screen area 21, by calculating differences of the color-component integration values ($\Sigma R'$, $\Sigma G'$, $\Sigma B'$) and integration value (A') that satisfy the threshold values, the system controller 9 calculates an integration value (skin-color-eliminated component-signal information) and integration area (skin-color-eliminated component-signal information) for auto white balance control.

The obtained integration values (represented by $\Sigma R_{W1}$, $\Sigma G_{W1}$, and $\Sigma B_{W1}$) and integration area (represented by $A_{W1}$) are represented by $$\Sigma R_{W1} = \Sigma R - \Sigma R'$$

$$\Sigma G_{W1} = \Sigma G - \Sigma G'$$

$$\Sigma B_{W1} = \Sigma B - \Sigma B'$$

$$A_{W1} = A - A'$$

In step S10a, the system controller 9 calculates a final auto white-balance-gain for auto white balance control by using the obtained integration values. Specifically, when the face has not been detected in the entire screen area 21, the auto white-balance-gain is calculated by using the integration values ($\Sigma R$, $\Sigma G$, $\Sigma B$) and the integration area (A). If the face has been detected in the entire screen area 21, the auto white-balance-gain is calculated by using the integration values ($\Sigma R_{W1}$, $\Sigma G_{W1}$, $\Sigma B_{W1}$) and the integration area ($A_{W1}$).

In step S11a, the system controller 9 outputs the calculated auto white-balance-gain to the WB amplifier 5.

After that, the WB amplifier 5 performs auto white balance control by using the auto white-balance-gain so that R=G=B.

Figure 9:
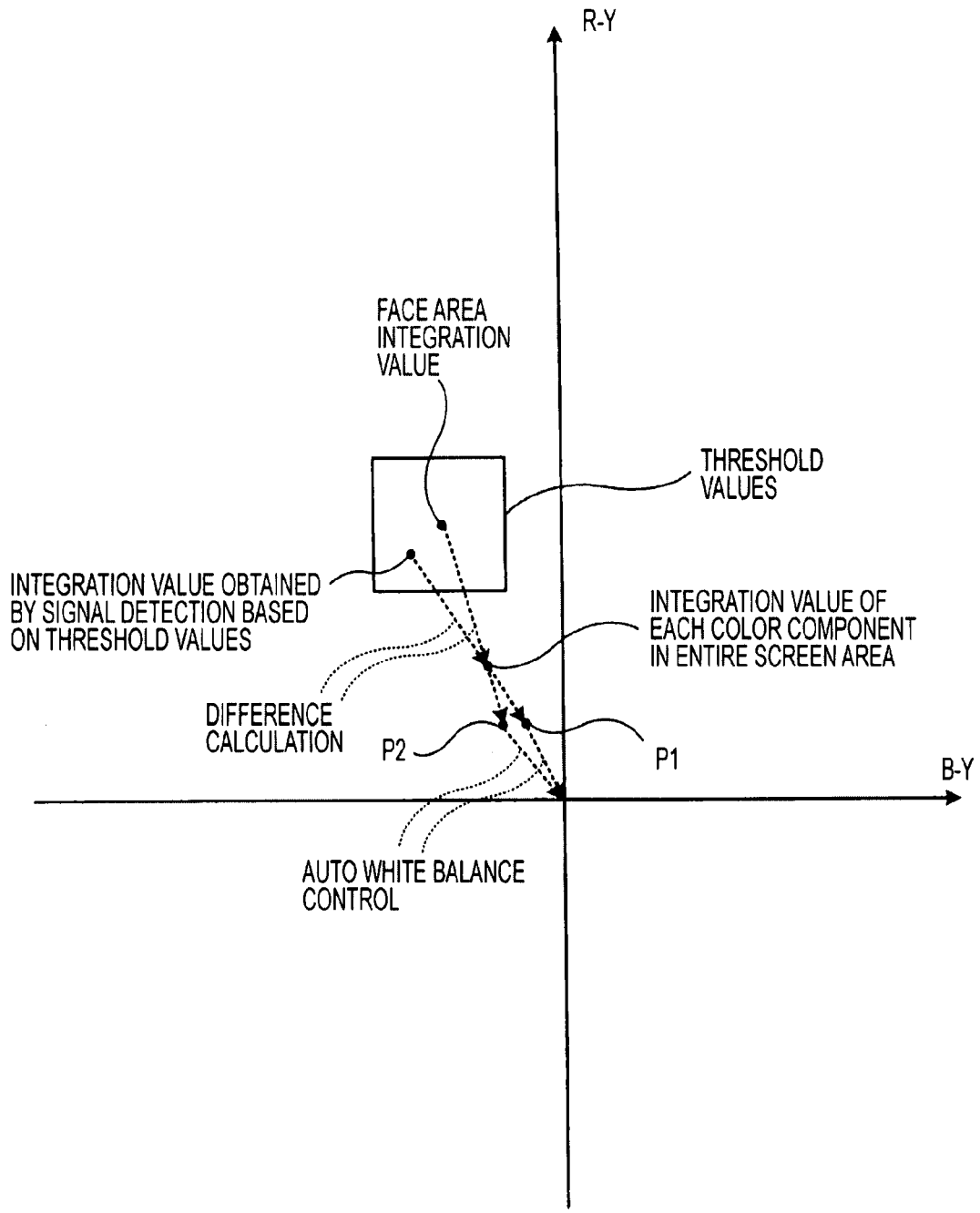
FIG. 9 is a schematic graph showing the operations of the image pickup apparatuses according to the first and second embodiments.

FIG. 9 is a schematic graph showing the operations of the image pickup apparatuses according to the first and second embodiments.

In FIG. 9, reference numeral P1 denotes an integration value for auto white balance control obtained by the operation of the image pickup apparatus according to the second embodiment when an undetected face exists. Reference numeral P2 denotes an integration value for auto white balance control obtained by the operation of the image pickup apparatus 1 according to the first embodiment when an undetected face exists. As is found in FIG. 9, in auto white balance control using integration value P2, the image is blue because the gain for the B component is higher than that in auto white balance control using integration value P1.

According to the image pickup apparatus according to the second embodiment, advantages similar to those in the first embodiment are obtained.

According to the image pickup apparatus according to the second embodiment, on the basis of color information of a detected face region, threshold values defining a skin color region in a picked-up image, and the threshold values are used to detect a skin color in the entire screen area 21. If, in step S3a, an undetected face exists, in the operation of the image pickup apparatus in steps S6a to S8a, a skin color of the undetected face is extracted, thus realizing auto white balance control that is not affected by the skin color.

In addition, according to the image pickup apparatus according to the second embodiment, not only color faces, but also all skin colors satisfying skin-color threshold values, that is, skin colors (e.g., a skin color of a person's arm, a cardboard color, etc.) that cause false detection in auto white balance control, can be extracted. Thus, highly accurate auto white balance control is realized.

Although, in the second embodiment, threshold values are set so that the skin color region is rectangular, the region is not limited to the rectangle, and the threshold values may be set so that the skin region is elliptic.

As described above, an image pickup apparatus, an image pickup method, an image processing apparatus, an image processing method, and an image processing program according to embodiments of the present invention have been described with reference to the accompanying drawings, but the present invention is not limited to the foregoing embodiments. The configuration of each component can be replaced by an arbitrary component having a similar function. In addition, in an embodiment of the present invention, an arbitrary different element and step may be added.

In addition, an embodiment of the present invention may have two or more arbitrary features in each of the foregoing embodiments.

Image pickup apparatuses to which embodiments of the present invention are applied are not particularly limited. Such image pickup apparatuses include, for example, digital still cameras, digital video cameras, cellular phones, and PDAs (personal digital assistants).

Although, in each foregoing embodiment, the present invention is applied to an image pickup apparatus, it is not limited thereto and may be applied to image processing apparatuses for processing input images. The image processing apparatuses are not particularly limited. For example, they may include printers.

The above-described processing functions may be realized by a computer (specifically, by allowing a computer to execute a predetermined image processing program). In this case, a program describing processing details of an image pickup apparatus and image processing apparatus is provided. By executing the program on the computer, the processing functions are realized on the computer. The program describing the processing details may be recorded on computer-readable recording media. The computer-readable recording media include, for example, magnetic recording devices, optical discs, magneto-optical recording media, and semiconductor memories. The magnetic recording devices include, for example, HDDs (hard disk drives), FDs (flexible disks), and magnetic tapes. The optical discs include, for example, DVDs (digital versatile discs), DVD-RAMs (digital versatile disc random access memories), CD-ROMs (compact-disc read-only memories) and CD-Rs (Recordable), and CD-RWs (ReWritable). The magneto-optical recording media include, for example, MOs (magneto-optical disc).

When the program is distributed, for example, transportable recording media, such as DVDs and CD-ROMs, containing the program are sold. In addition, by storing the program in a storage device of a server computer, the program can be transferred from the server computer to another computer.

A computer that executes the program stores, in its storage device, for example, the program contained in a transportable recording medium or the program transferred from the server computer. The computer reads the program from its storage device and executes processing in accordance with the program. The computer can also execute the processing in accordance with the program by directly reading the program from the transportable recording medium. In addition, whenever the program is transferred from the server computer, the computer can sequentially execute processing in accordance with the received program.

It should be understood by those skilled in the art that various modifications, combinations, subcombinations and alterations may occur depending on design requirements and other factors insofar as they are within the scope of the appended claims or the equivalents thereof.

What is claimed is:

1. An electronic apparatus comprising an image processing unit configured to:
   perform achromatic color extraction on a first area of an input image by using a first set of threshold values to obtain first extracted-color-component signals;
   perform a face detection procedure to detect a face in the first area;
   set a face area within the first area, where a location of the face area corresponds to a location of the detected face;
   perform achromatic color extraction on the face area using a second set of threshold values to obtain second extracted-color-component signals;
   calculate a third set of threshold values based on the second extracted-color-component signals;
   perform achromatic color extraction on the first area by using the third set of threshold values to obtain third extracted-color-component signals;
   create skin-color-eliminated-component-signal-information by eliminating the third extracted-color-component signals from the first extracted-color-component signals; and
   set a white balance gain value by using the skin-color-eliminated component-signal information.

2. The electronic apparatus of claim 1, wherein the image processing unit is further configured to:
- generate first color-component-integration-values by integrating corresponding ones of the first extracted-color-component signals;
- generate third color-component-integration-values by integrating corresponding ones of the third extracted-color-component signals;
- create the skin-color-eliminated component-signal information by calculating respective differences between the first color-component-integration-values and the third color-component-integration-values.

3. The electronic apparatus of claim 1, wherein the first set of threshold values and the second set of threshold values are different.

4. The electronic apparatus of claim 1, wherein the first set of threshold values and the second set of threshold values are the same.

5. The electronic apparatus of claim 2, further comprising:
- an image pickup unit for picking up the input image, the image pickup unit including an optical unit and a solid state image sensor,
- wherein the image processing unit comprises:
  - a detection circuit for performing achromatic color extraction;
  - a white balance amplifier circuit configured to adjust the white balance of the input image based on the white balance gain value and to output an output image signal;
  - a control unit configured to control operation of the image pickup unit and the detection unit, to set the white balance gain value, and to output the white balance gain value to the white balance amplifier circuit; and
  - a signal processing circuit for performing signal processing on the output image signal output by the white balance amplifier circuit.

6. The electronic apparatus of claim 5, further comprising a dedicated face detection unit, separate from the signal processing circuit, for performing the face detection procedure.

7. The electronic apparatus of claim 1,
- wherein the image processing unit is further configured to generate second color-component-integration-values by integrating corresponding ones of the second extracted-color-component signals, and
- the third set of threshold values correspond to a range of a predetermined size plotted on a color plane centered at a coordinate corresponding to the second color-component-integration-values.

8. The electronic apparatus of claim 7,
wherein the range has a rectangular shape.

9. The electronic apparatus of claim 7,
wherein the range has an elliptical shape.

10. The electronic apparatus of claim 7, wherein the predetermined size of the range is set based on a type of light source used to pick up the input image.

11. The electronic apparatus of claim 1, wherein the predetermined shape of the face area is rectangular.

12. The electronic apparatus of claim 1, wherein the first area is an entire-screen area of the input image.

13. A method of processing a captured image comprising:
- performing, by a processing unit, achromatic color extraction on a first area of the image by using a first set of threshold values to obtain first extracted-color-component signals;
- performing, by the processing unit, a face detection procedure to detect a face in the first area;
- setting a face area within the first area, where the face area has a predetermined shape and a location thereof corresponds to a location of the detected face;
- performing achromatic color extraction on the face area using a second set of threshold values to obtain second extracted-color-component signals;
- calculating, by the processing unit, a third set of threshold values based on the second extracted-color-component signals;
- performing achromatic color extraction on the first area by using the third set of threshold values to obtain third extracted-color-component signals;
- creating skin-color-eliminated-component-signal-information by eliminating the third extracted-color-component signals from the first extracted-color-component signals; and
- setting, by the processing unit, a white balance gain value by using the skin-color-eliminated component-signal information.

14. An image processing computer program product comprising a non-transitory computer readable medium including program code stored thereon, said program code being executable to perform operations comprising:
- performing achromatic color extraction on a first area of the image by using a first set of threshold values to obtain first extracted-color-component signals;
- performing a face detection procedure to detect a face in the first area;
- setting a face area within the first area, where the face area has a predetermined shape and a location thereof corresponds to a location of the detected face;
- performing achromatic color extraction on the face area using a second set of threshold values to obtain second extracted-color-component signals;
- calculating a third set of threshold values based on the second extracted-color-component signals;
- performing achromatic color extraction on the first area by using the third set of threshold values to obtain third extracted-color-component signals;
- creating skin-color-eliminated-component-signal-information by eliminating the third extracted-color-component signals from the first extracted-color-component signals; and
- setting a white balance gain value by using the skin-color-eliminated component-signal information.

* * * * *